United States Patent
Larsen

(10) Patent No.: US 11,330,752 B2
(45) Date of Patent: May 17, 2022

(54) VARIABLE ANGLE DISC HUB FOR A TILLER JUMP ARM ASSEMBLY

(71) Applicant: CNH Industrial America LLC, New Holland, PA (US)

(72) Inventor: David Larsen, Cowra (AU)

(73) Assignee: CNH Industrial America LLC, New Holland, PA (US)

( * ) Notice: Subject to any disclaimer, the term of this patent is extended or adjusted under 35 U.S.C. 154(b) by 42 days.

(21) Appl. No.: 16/848,044

(22) Filed: Apr. 14, 2020

(65) Prior Publication Data

US 2020/0323121 A1    Oct. 15, 2020

Related U.S. Application Data

(60) Provisional application No. 62/834,047, filed on Apr. 15, 2019.

(51) Int. Cl.
*A01B 15/20* (2006.01)
*A01B 5/04* (2006.01)

(52) U.S. Cl.
CPC ............ *A01B 15/20* (2013.01); *A01B 5/04* (2013.01)

(58) Field of Classification Search
CPC ....... A01B 33/02; A01B 33/024; A01B 33/06; A01B 33/103; A01B 33/14; A01B 33/142
See application file for complete search history.

(56) References Cited

U.S. PATENT DOCUMENTS

| | | | | |
|---|---|---|---|---|
| 358,246 A | * | 2/1887 | Arnett | A01B 23/06 |
| | | | | 172/604 |
| 657,204 A | * | 9/1900 | Poole | A01B 23/06 |
| | | | | 384/460 |
| 692,190 A | * | 1/1902 | Bailey | A01B 23/06 |
| | | | | 384/157 |
| 1,046,231 A | * | 12/1912 | Stainfield et al. | A01B 13/00 |
| | | | | 172/575 |
| 1,095,798 A | * | 5/1914 | Brennan, Jr. | A01B 13/00 |
| | | | | 172/575 |
| 1,165,735 A | * | 12/1915 | Wentz | A01B 39/04 |
| | | | | 172/254 |
| 1,170,740 A | * | 2/1916 | Dickinson | A01B 13/00 |
| | | | | 172/575 |
| 1,374,987 A | * | 4/1921 | Christopherson | F16C 33/36 |
| | | | | 384/571 |
| 1,476,521 A | * | 12/1923 | Kell | A01D 45/02 |
| | | | | 56/102 |
| 1,584,616 A | * | 5/1926 | Cothran | A01B 23/06 |
| | | | | 384/460 |
| 2,698,565 A | * | 1/1955 | Carney | A01B 39/14 |
| | | | | 172/574 |

(Continued)

*Primary Examiner* — Jessica H Lutz
(74) *Attorney, Agent, or Firm* — Rebecca L. Henkel; Rickard K. DeMille

(57) ABSTRACT

A jump arm assembly for a tilling machine includes a jump arm and a disc hub assembly. The jump arm has a first end coupled to a frame unit of the tilling machine and a second end opposite the first end. The disc hub assembly includes a an arm end configured to be fixedly secured to the second end of the jump arm, and an opposing disc end. A first plane defined by the arm end of the disc hub assembly is arranged in non-parallel relation with respect to a second plane defined by the disc end of the disc hub assembly.

20 Claims, 12 Drawing Sheets

(56) References Cited

U.S. PATENT DOCUMENTS

| | | | | |
|---|---|---|---|---|
| 2,746,371 | A * | 5/1956 | Cook | A01B 5/06 172/604 |
| 2,924,189 | A * | 2/1960 | McLeod | A01C 7/06 111/187 |
| 3,362,482 | A * | 1/1968 | Riddle | A01B 33/142 172/119 |
| 3,397,933 | A * | 8/1968 | Hatcher | A01B 71/04 384/460 |
| 4,196,779 | A * | 4/1980 | Steilen | A01B 71/04 172/126 |
| 4,345,531 | A * | 8/1982 | Redl | A01B 77/00 111/164 |
| 4,590,869 | A * | 5/1986 | Steilen | A01C 5/064 111/164 |
| 4,732,398 | A * | 3/1988 | Biss | A01B 71/08 111/164 |
| 4,765,262 | A * | 8/1988 | Morgan | A01C 5/064 111/164 |
| 5,595,130 | A * | 1/1997 | Baugher | A01C 7/205 111/164 |
| 5,673,757 | A * | 10/1997 | McDonald | A01B 15/16 111/158 |
| 5,802,995 | A * | 9/1998 | Baugher | A01C 5/068 111/140 |
| 5,822,860 | A * | 10/1998 | Wadsworth-Dubbert | B23P 11/00 29/898.061 |
| 5,904,107 | A * | 5/1999 | Kester | A01C 5/068 111/135 |
| 6,082,276 | A * | 7/2000 | Klein | A01C 5/064 111/164 |
| 6,105,251 | A * | 8/2000 | Payen | F16C 19/186 29/898.06 |
| 6,257,678 | B1 * | 7/2001 | Brookey | B60B 27/02 301/105.1 |
| 6,364,426 | B1 * | 4/2002 | Horne | B24B 5/06 188/218 XL |
| 6,659,193 | B1 * | 12/2003 | Best | A01B 63/26 111/69 |
| 6,832,854 | B2 * | 12/2004 | Umekawa | B60B 27/00 384/537 |
| 6,913,085 | B2 * | 7/2005 | Ruckle | A01B 21/086 111/164 |
| 8,096,045 | B2 * | 1/2012 | Gingrich | B60B 27/0005 29/724 |
| 8,899,345 | B2 * | 12/2014 | Lazcano Lasa | A01B 71/04 172/604 |
| 9,107,340 | B2 * | 8/2015 | Stark | A01B 15/16 |
| 10,015,925 | B2 * | 7/2018 | Birck | F16C 19/548 |
| 10,051,771 | B2 * | 8/2018 | Gebbeken | A01B 15/18 |
| 2003/0201108 | A1 * | 10/2003 | Linden | A01B 71/04 172/604 |
| 2012/0045155 | A1 * | 2/2012 | Morero | F16J 15/3264 384/480 |
| 2018/0347562 | A1 * | 12/2018 | Base | B60B 27/0073 |

\* cited by examiner

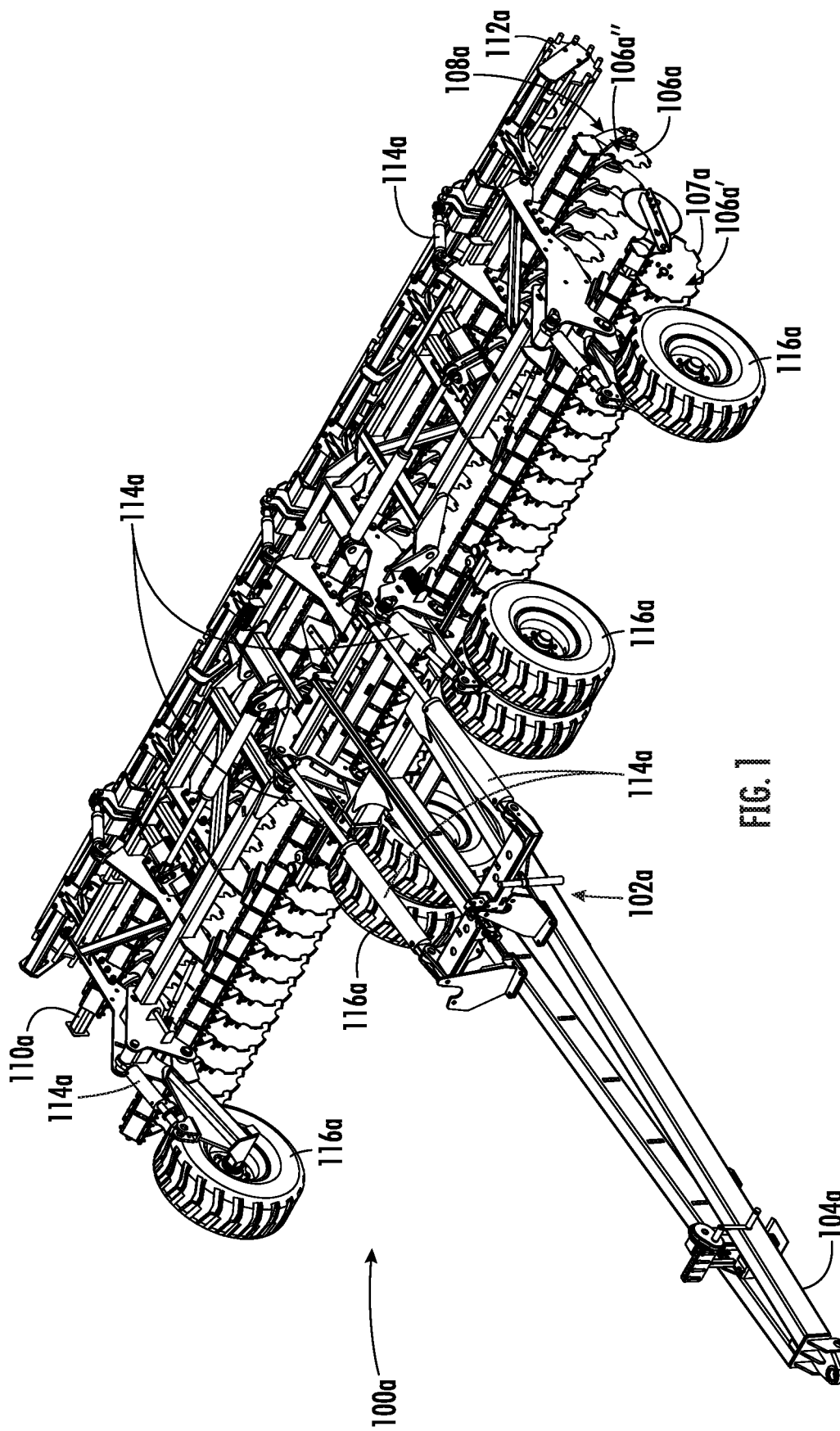

VARIABLE ANGLE DISC HUB FOR A TILLER JUMP ARM ASSEMBLY

CROSS-REFERENCE TO RELATED APPLICATIONS

The present application is based upon and claims the right of priority to U.S. Provisional Patent Application No. 62/834,047, filed Apr. 15, 2019, the disclosure of which is hereby incorporated by reference herein in its entirety for all purposes.

FIELD OF THE INVENTION

The present invention generally relates to soil cultivation, and more particularly to a tilling machine, and still more particularly to a tilling machine including tilling discs, with each tilling disc being mounted to a respective jump arm of the tilling machine via a variable angle disc hub assembly.

BACKGROUND OF THE INVENTION

For successful farming, soil cultivation is an essential first step. That is, the ground must first be properly prepared before seeds or plants can be planted. Tilling machines are used to break up the soil and are available for both small and large agricultural users. For those with small home gardens (e.g., less than about 200 square yards), a rototiller is typically sufficient. Most rototillers include a motor driven shaft which carries any number of blades and tines. As the shaft rotates, the blades rotate such that the tines serially enter and leave the ground, thereby tearing up the soil. While generally sufficient for small locations, rototillers are not practical for large farming applications, where planting fields may cover thousands of square yards of land. Large scale farm operations typically use tractor-drawn tilling machines. These tilling machines are generally unpowered and consist of one or more rows of rotating discs. As the machine is towed, the rotating blades dig into and turn over the soil. Additional tools may be coupled to the tilling machine, such as a roller which typically follows the last row of discs and levels the prepared soil. Additional blades may also be used to create furrows to prepare the ground for seed planting.

While current tilling machines generally perform their intended purpose, these machines suffer from a number of drawbacks. By way of example, rotating disc tilling machines may have difficulty when turning rocky soil. For instance, when encountering a large rock, the impacted disc may be caused to pivot on its frame, resulting in inoperability of that disc for the remainder of the tilling unless operations are stopped and the disc is repaired. The disc may also translate laterally on its frame, thereby creating gaps in the tilled soil. These gaps leave unwanted, unbroken soil unsuitable for growing. Again, tilling operations would need to be ceased to correct the alignment of the discs. In a worst case scenario, a disc may become bent or broken, thereby requiring replacement of the damaged disc. Typically, discs are secured to the tilling machine frame using anywhere from four to eight bolts. As a result, changing of discs may be a time-consuming activity, particularly when performed out in the field.

Thus, what is needed is an improved tilling machine, such as a tilling machine that maintains desired disc alignment and orientation, even in difficult soil conditions, and promotes fast and easy blade adjustment and/or replacement, if required. The present subject matter satisfies this need as well as other needs.

SUMMARY OF THE INVENTION

Aspects and advantages of the invention will be set forth in part in the following description, or may be obvious from the description, or may be learned through practice of the invention.

In view of the above and in accordance with one aspect of the disclosure, the present subject matter is generally directed to a jump arm assembly for a tilling machine. The tilling machine includes a frame unit coupled to a hitch configured to mount to a vehicle, whereby the tilling machine is towed across a field. The jump arm assembly comprises a jump arm and a disc hub assembly. The jump arm has a first end configured to be coupled to the frame unit and a second end opposite the first end. The disc hub assembly is configured to couple a tilling disc to the second end of the jump arm. The disc hub assembly comprises a hub housing defining an arm end of the disc hub assembly. The arm end is configured to be positioned adjacent to the second end of the jump arm. The disc hub assembly also includes a shaft including a first axial shaft section and a second axial shaft section, with the first axial shaft section being rotatably mounted within the hub housing and the second axial shaft section configured to releasably secure a tilling disc to the disc hub assembly. The second axial shaft section is at least partially threaded (e.g., by defining male threads) to receive a threaded nut (e.g., a single threaded nut) for securing the tilling disc to the disc hub assembly.

In one embodiment, the disc hub assembly may further comprise a bearing received within the hub housing, wherein the first axial shaft section of the shaft is received within the bearing. In another embodiment, the jump arm assembly may further include an end plate including a plate body having a front surface, a rear surface, and an aperture defined through the plate body between the front and rear surfaces. The shaft is received within the aperture and extends therethrough such that the second axial shaft section of the shaft extends outwardly relative to the plate body. The rear surface of the end plate abuts the hub housing and the front surface is configured to abut the tilling disc when the tilling disc is secured to the disc hub by the threaded nut being received on the threaded portion of the second axial shaft section. A seal may also be located between the rear surface of the end plate and an outer surface of the hub housing.

In a further aspect of the disclosure, the present subject matter is generally directed to a variable angle disc hub assembly for a jump arm assembly for a tilling machine. The tilling machine includes a frame unit coupled to a hitch configured to mount to a vehicle, whereby the tilling machine is towed across a field. The jump arm assembly includes a jump arm having a first end configured to be coupled to the frame unit and a second end opposite the first end, with the second end configured to be coupled to a tilling disc of the tilling machine. The variable angle disc hub assembly comprises a hub housing defining an arm end of the disc hub assembly, with the arm end configured to be positioned adjacent to the jump arm when the assembly is coupled to the jump arm. The disc hub assembly further comprises an end plate provided in operative association with the hub housing and defining a disc end of the disc hub assembly, with the disc end configured to be positioned adjacent to the tilling disc when the disc is coupled to the hub assembly. Additionally, a first plane defined by the arm end of the disc hub assembly is arranged in non-parallel relation with respect to a second plane defined by the disc end of the disc hub assembly.

In one embodiment, the disc hub assembly further includes a shaft having a first axial shaft section rotatably mounted within the hub housing and a second axial shaft section configured to releasably secure a tilling disc to the disc hub assembly. Additionally, the disc hub assembly includes a bearing received within the hub housing, wherein the first axial shaft section of the shaft is received within the bearing. In one embodiment, the hub housing may also include an annular array of equally spaced mounting features, wherein each mounting feature is configured to matingly couple with a corresponding mounting element to secure the hub housing to the second end of the jump arm.

In one embodiment, the second axial shaft section may be at least partially threaded (e.g., by defining male threads) to receive a single threaded nut to secure the tilling disc to the disc hub. Additionally, the end plate of the disk hub assembly may include a plate body having a front surface, a rear surface, and an aperture defined through the plate body between the front and rear surfaces. The shaft is received within the aperture and extends therethrough such that the second axial shaft section projects outwardly from the plate body, with the rear surface of the end plate abutting the hub housing. The front surface is configured to abut the tilling disc when the tilling disc is mounted on the shaft. In addition, a seal may be located between the rear surface of the end plate and an outer surface of the hub housing.

In another aspect of the disclosure, the present subject matter is generally directed to a tilling machine configured to be towed across a field. The tilling machine includes a frame having a jump arm frame unit. The tilling machine also includes a plurality of jump arm assemblies supported along a length of the jump arm frame unit such that a lateral gap is defined between each adjacent pair of jump arm assemblies. Each jump arm assembly of the plurality of jump arm assemblies comprises a jump arm, a clamp unit, and a tilling disc. The jump arm has a first end and a second end, and the clamp unit is configured to couple the jump arm to the jump arm frame unit. The clamp unit comprises at least two clamp subunits, with the first end of the jump arm being connected to a first clamp unit of the at least two clamp subunits. The tilling disc is coupled to the second end of the jump arm. Additionally, the tilling machine further includes a plurality of jump arm spacers, with each jump arm spacer being provided in operative association with the clamp unit of a respective jump arm assembly to maintain the lateral gap between said each adjacent pair of jump arm assemblies. For instance, in one embodiment, successive or adjacent jump arm spacers may be configured to engage or abut each other to maintain the desired lateral spacing between the adjacent pairs of jump arm assemblies.

In one embodiment, each jump arm assembly further includes a disc hub assembly comprising a hub housing having an arm end fixedly secured to the second end of the jump arm, and a shaft having a first axial shaft section rotatably mounted within the hub housing and a second axial shaft section configured to releasably secure a tilling disc to the disc hub assembly. Additionally, in one embodiment, a first plane defined by the arm end of the hub housing is arranged in non-parallel relation with respect to a second plane defined by an opposed disc end of the disc hub assembly. Moreover, in one embodiment, the disc hub assembly may further include a bearing received within the hub housing, wherein the first axial shaft section of the shaft is received within the bearing. The second axial shaft section may be at least partially threaded (e.g., by defining male threads) to receive a single threaded nut for securing the tilling disc to the disc hub assembly.

In one embodiment, the disc hub assembly may further include an end plate including a plate body having a front surface, a rear surface, and an aperture defined through the plate body between the front and rear surfaces. The shaft is received within the aperture and extends therethrough such that the second axial shaft section projects outwardly beyond the plate body, with the rear surface of the end plate abutting the hub housing. The front surface is configured to abut the tilling disc when the tilling disc is mounted on the shaft. A seal may also be located between the rear surface of the end plate and an outer surface of the hub housing. Additionally, in one embodiment, each jump arm assembly may further include at least one jump arm support located between each clamp subunit and the jump arm frame. The at least one jump arm support is fabricated from one or more of rubber, natural polymers, and/or synthetic polymers. Additionally, in one embodiment, the jump arm spacer may be a length of folded steel.

In still a further aspect of the disclosure, the present subject matter is generally directed to a jump arm apparatus for a tilling machine that includes a frame coupled to a hitch configured to mount to a vehicle, whereby the tilling machine is towed across a field. The jump arm apparatus comprises a jump arm frame unit and a plurality of jump arm assemblies coupled to the jump arm frame unit. The jump arm frame unit has a triangular transverse cross section. Each jump arm assembly of the plurality of jump arm assemblies comprises a jump arm having a first end and a second end. Each jump arm assembly also includes a clamp unit configured to couple the jump arm to the jump arm frame unit. The clamp unit includes a plurality of clamp subunits, wherein the first end of the jump arm is connected to a first clamp subunit of the plurality of clamp subunits. Additionally, each jump arm assembly includes a tilling disc coupled to the second end of the jump arm. In one embodiment, the plurality of clamp subunits is three subunits and the triangular transverse cross section defines an equilateral triangle.

In one embodiment, a space or lateral gap is defined between each successive jump arm assembly along the jump arm frame unit. The jump arm apparatus further includes a jump arm spacer mounted to each clamp unit, whereby successive jump arm spacers engage one another to maintain the desired lateral spacing between adjacent jump arm assemblies.

Additionally, in one embodiment, each jump arm assembly may further comprise a disc hub assembly including a hub housing and a shaft. The hub housing defines an arm end of the disc hub assembly that is fixedly secured to the second end of the jump arm. The shaft has a first axial shaft section rotatably mounted within the hub housing and a second axial shaft section configured to releasably secure a tilling disc to the disc hub. In one embodiment, a first plane defined by the arm end of the disc hub assembly is arranged in non-parallel relation with respect to a second plane defined by a disc end of the disc hub assembly. Moreover, in one embodiment, the disc hub assembly may further include a bearing received within the hub housing, wherein the first axial shaft section of the shaft is received within the bearing, while the second axial shaft section is at least partially threaded (e.g., by defining male threads) to receive a single threaded nut to secure the tilling disc to the disc hub. In one embodiment, each disc hub assembly may further comprise an end plate including a plate body having a front surface, a rear surface, and an aperture defined through the plate body between the front and rear surfaces. The shaft is received within the aperture and extends therethrough such that the second axial shaft section projects outwardly beyond the plate body, with the rear surface of the end plate abutting the hub housing. The front surface is configured to abut the tilling disc when the disc is mounted on the shaft and a seal may be located between the rear surface of the end plate and an outer surface of the hub housing.

Further, in one embodiment, each jump arm assembly may further include at least one jump arm support located between each clamp subunit and a respective planar surface or end face of the jump arm frame unit. The at least one jump arm support is fabricated from one or more of rubber, natural polymers and/or synthetic polymers. Additionally, in one embodiment, the jump arm spacer is a length of folded steel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a tilling machine in accordance with aspects of the present subject matter;

Figure 2A:
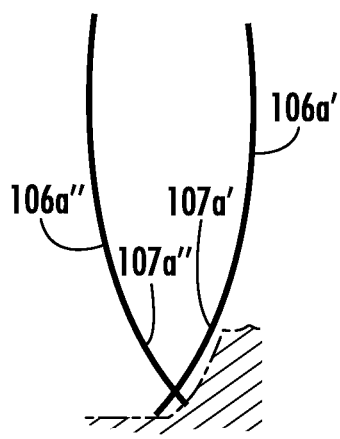
FIG. 2A illustrates a schematic view of an example of proper positioning of forward and rear disc rows during use of a tilling machine in accordance with aspects of the present subject matter.

Repeat use of reference characters in the present specification and drawings is intended to represent the same or analogous features or elements of the present technology.

DETAILED DESCRIPTION OF THE PREFERRED EMBODIMENTS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a tilling machine for use in performing a tilling operation within a field. Additionally, the present subject matter is directed to various apparatus and assemblies configured for use on and/or within the disclosed tilling machine. In this regard, each individual apparatus and/or assembly may be configured for use on and/or within a tilling machine without the use of any other apparatus and/or assembly described herein. Alternatively, one or more of the disclosed apparatus and/or assemblies (including all of such apparatus and/or assemblies) may be used combination on and/or within a tilling machine.

Referring now to the drawings, and with particular reference to FIG. 1, a perspective view of one embodiment of a tilling machine 100a is illustrated in accordance with aspects of the present subject matter. As shown, the tilling machine 100a corresponds to a tillage implement and generally includes a frame unit 102a coupled to a hitch 104a. Hitch 104a mounts tilling machine 100a to a conveyance, such as a tractor, for towing tilling machine 100a. Frame unit 102a may include one or more rows of tilling discs 106a (e.g., front and rear disc rows), with each disc 106a being mounted onto a respective jump arm assembly 108a. To that end, frame unit 102a includes one or more jump arm frame units or toolbars 110a (e.g., one for each disc row) upon which jump arm assemblies 108a are arranged, as will be described in greater detail below. Tilling discs 106a are configured to penetrate and rotate within the soil so as to loosen the soil. By way of example and without limitation thereto, each tilling disc 106a may be generally bowl-shaped and may include a distal cutting edge 107a configured to penetrate the soil. In a further example, cutting edge 107a may be continuous or scalloped (compare edge 107a in FIG. 3 and edge 107 in FIG. 6) and may have differing disc diameters and degrees of curvature, depending upon user needs or preferences. One or more rollers 112a may also be mounted to frame unit 102a, whereby the roller(s) 112a may be configured to further break up any clumps of soil produced by tilling discs 106a, while also leveling the ground in preparation for planting. Various hydraulic cylinders 114a may be operated, for example, to set and maintain the penetration depth of tilling discs 106a. Additionally, pneumatic tires 116a support the weight of frame unit 102a.

Figure 2B:
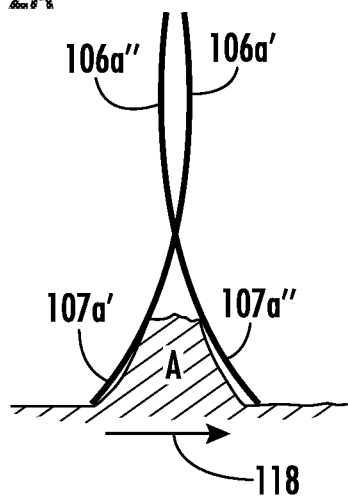
FIG. 2B illustrates a schematic view of an example of improper positioning of forward and rear disc rows during use of a tilling machine in accordance with aspects of the present subject matter, with the forward disc overlapping the rear disc.
Figure 2C:
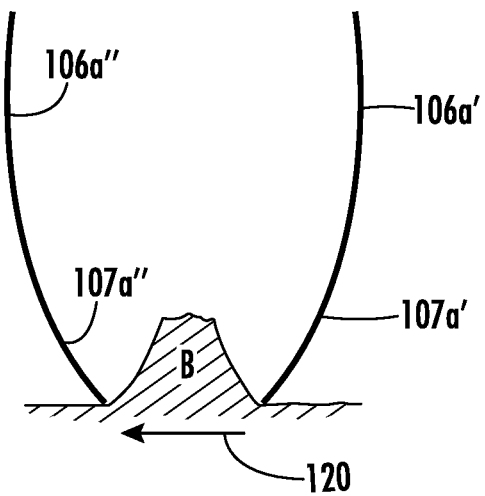
FIG. 2C illustrates a schematic view of another example of improper positioning of forward and rear disc rows during use of a tilling machine in accordance with aspects of the present subject matter, with the forward disc spaced apart from the rear disc.

In accordance with an aspect of the present subject matter, tilling machine 100a is configured to include forward and rear disc rows 106a', 106a", respectively. With additional reference to FIGS. 2A-2C, forward disc row 106a' may include tilling discs 106a oriented to penetrate the ground at a first angle while facing in a first direction (e.g., to the right in each of FIGS. 2A-2C), while rear disc row 106a" is oriented to penetrate the ground at a second angle while facing in the opposite direction (e.g., to the left in each of FIGS. 2A-2C). In one embodiment, forward disc row 106a' may be laterally adjustable to properly position the cutting edge 107a' of each disc 106a of the forward disc row 106a' with respect to the cutting edge 107a" of each disc 106a of the rear disc row 106a" (FIG. 2A). Should cutting edge 107a' overlap cutting edge 107a" (FIG. 2B), forward disc row 106a' may be laterally adjusted, such as in the direction of arrow 118 so as to remove ridge A formed between the overlapping cutting edges (e.g., to the position shown in FIG. 2A). Alternatively, should cutting edge 107a' be spaced apart from cutting edge 107a" (FIG. 2C), forward disc gang 106a' may be laterally adjusted, such as in the direction of arrow 120 so as to remove ridge B which is formed due to lack of engagement of either cutting edge 107a', 107a" (e.g., to the position shown in FIG. 2A).

It should be appreciated that the tilling machine and disc rows shown in FIGS. 1 and 2A-2C are simply illustrated to provide one example of a suitable tillage implement configuration. In other embodiments, the tilling machine may have any other suitable implement configuration.

Figure 3:
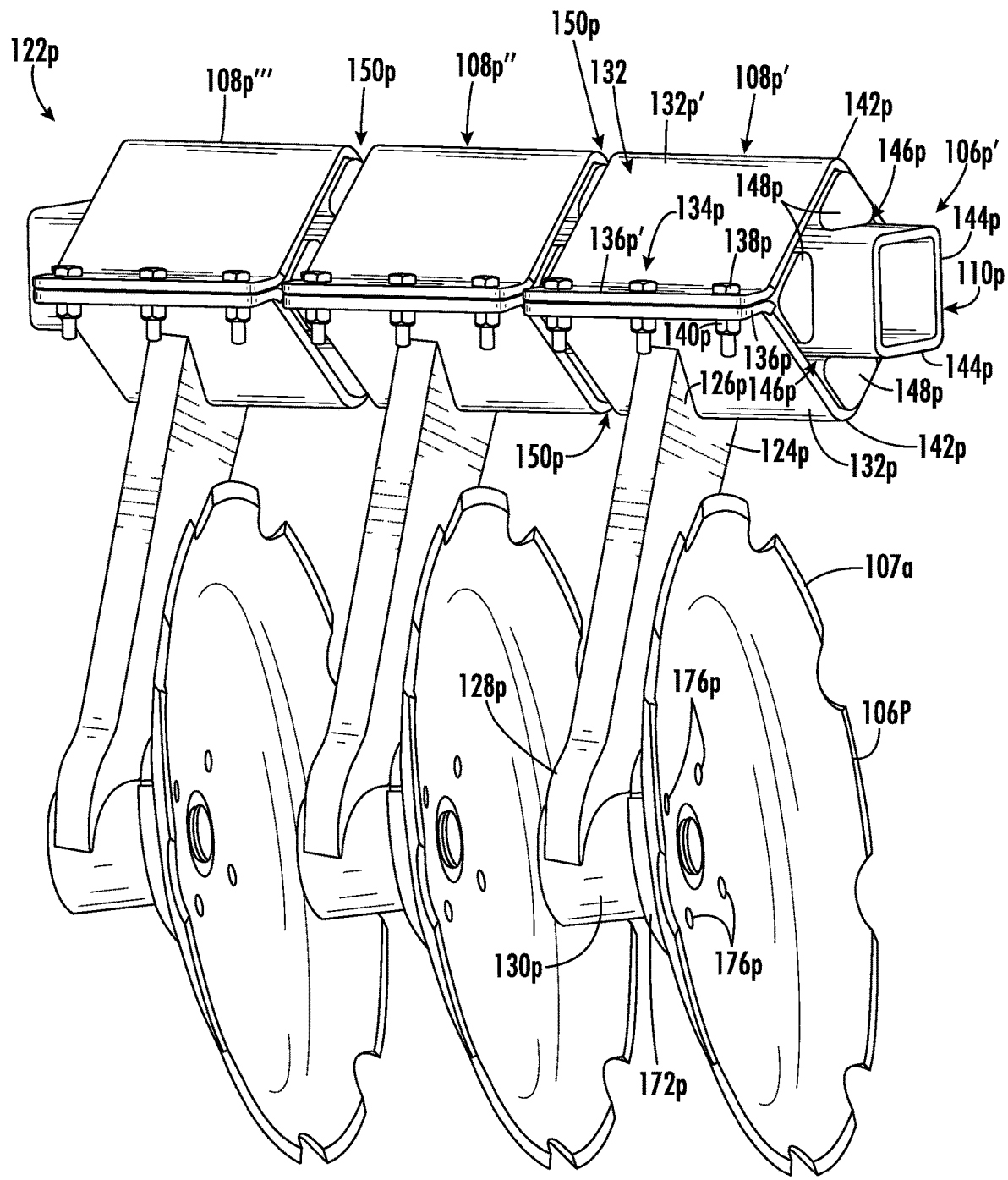
FIG. 3 illustrates a perspective view of a portion of a prior art tilling machine, particularly illustrating a portion of a disc row of the tilling machine.

Turning now to FIG. 3, a partial, perspective view of a portion 122p of a prior art disc row 106p' is provided for comparison purposes. As shown, the prior art disc row 106p' generally includes a plurality of jump arm assemblies (e.g., first, second, and third jump arm assemblies 108p', 108p" 108p''', respectively) mounted onto a jump arm frame unit 110p. It should be noted that each jump arm assembly 108p', 108p" 108p''' is identical and the below discussion will be directed solely to the first jump arm assembly 108p' for sake of clarity. Jump arm frame unit 110p is a square member, typically made from ⅜ inch (9.525 mm) tubular steel. Jump arm assembly 108p' comprises a jump arm 124p having a first end 126p configured to mount or be coupled to jump arm frame unit 110p and a second end 128p opposite the first end 126p. Second end 128p is coupled to a disc hub 130p, with a respective tilling disc 106p being rotationally mounted thereon. First end 126p of jump arm 124p is secured to a first clamp subunit 132p, such as through a weld. A second clamp subunit 132p' is then secured to first clamp subunit 132p such that the jump arm frame unit 110p located or clamped between the combined clamp subunits. For instance, fasteners 134p are inserted through paired flanges 136p, 136p' on respective first and second clamp subunits 132p, 132p' to allow the clamp subunits 132p, 132p' to be clamped around the jump arm frame unit 110p. Fasteners 134p may include a bolt 138p and nut 140p.

Combined first and second clamp subunits 132p, 132p' define a clamp unit 132 having a diamond shaped transverse cross section such that the corners 142p of the diamond are positioned generally at the midpoint of the planar surfaces of 144p of square jump arm frame unit 110p so as to define generally triangularly shaped voids 146p between clamp subunits 132p, 132p' and jump arm frame unit 110p. Each void 146p receives a respective jump arm support 148p. Jump arm supports 148p are typically fabricated from rubber, although other non-limiting examples of suitable support materials include compressible natural and synthetic polymeric materials and/or blends thereof. Jump arm supports 148p operate as torsional supports to absorb shock to the jump arm assembly 108p' during tilling. Jump arm supports 148p also promote flexing of jump arm assembly 108p' while maintaining downforce to jump arm assembly 108p' and tilling disc 106p, such as when striking a large rock within the soil. Typically, successive jump arm assemblies 108p', 108p" 108p''' are mounted onto the jump arm frame unit 110p with a space or lateral gap 150p therebetween. However, while jump arm supports 148p assist in resisting rotation forces subjected to jump arm assemblies 108p', 108p" 108p''' and tilling disc 106p, the jump arm supports 148p do not prevent lateral displacement of the jump arm assemblies 108p', 108p" 108p''' along the length of the jump arm frame unit 110p.

Figure 4:
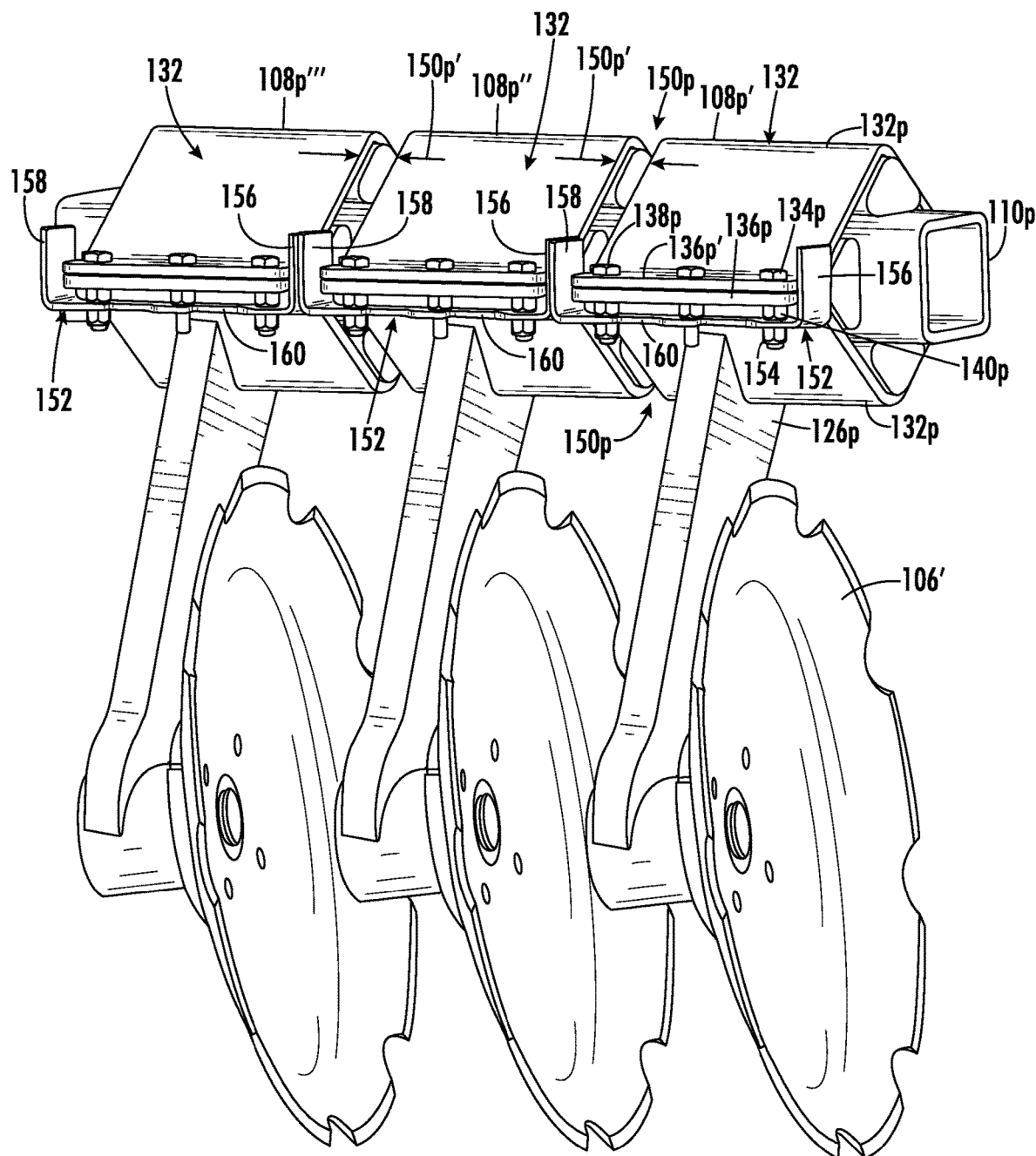
FIG. 4 illustrates a perspective view of one embodiment a portion of a tilling machine in accordance with aspects of the present subject matter, particularly illustrating a plurality jump arm assemblies of a disc row of the tilling machine, with each jump arm assembly including or being provided in operative association with a corresponding jump arm spacer.
Figure 5:
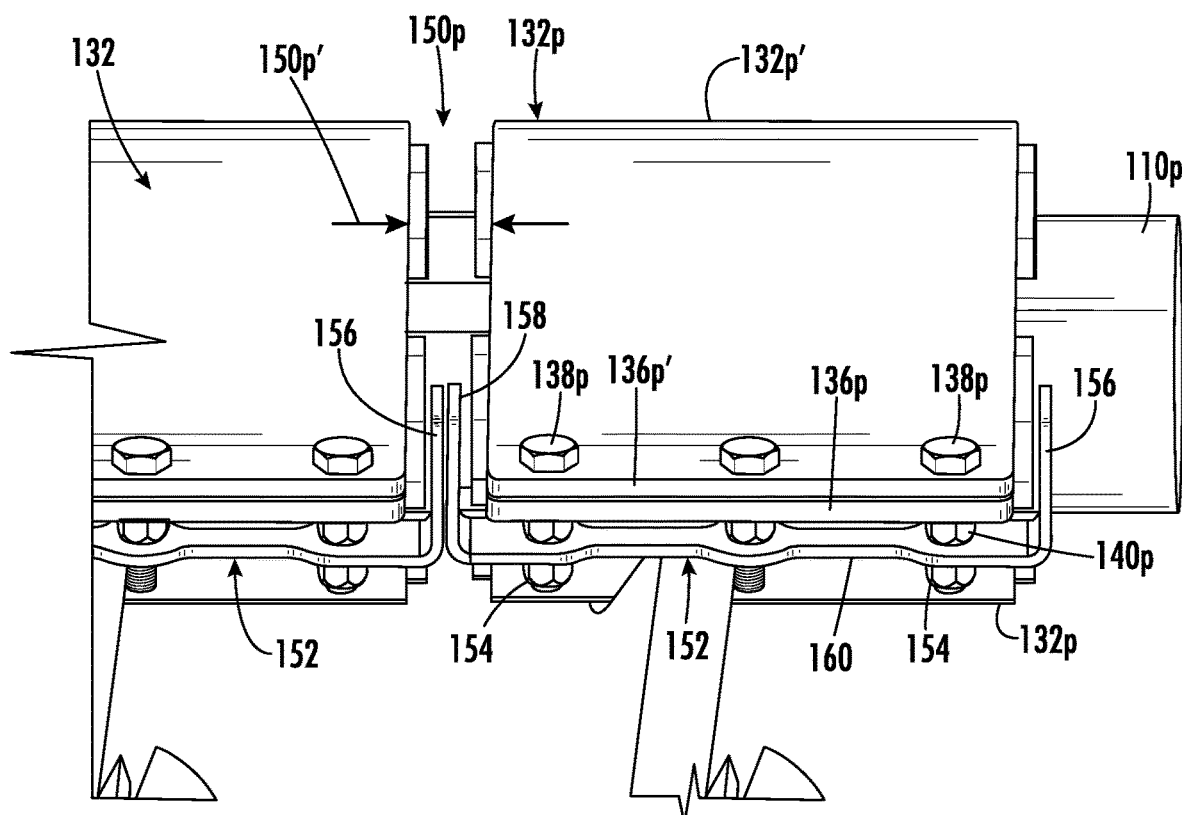
FIG. 5 illustrates close-up view of one of the jump arm spacers shown in FIG. 4.

Referring now to FIGS. 4 and 5, differing views of one embodiment of a portion of a disc row of a tilling machine are illustrated in accordance with aspects of the present subject matter. Specifically, FIG. 4 illustrates a partial perspective view of the disc row, particularly illustrating a plurality of jump arm assemblies (e.g., first, second, and third jump arm assemblies 108p', 108p" 108p''', respectively) mounted onto a corresponding toolbar or jump arm frame unit 110p. Additionally, FIG. 5 illustrates a close-up portion of one of the jump arm assemblies shown in FIG. 4.

As shown in FIGS. 4 and 5, unlike the embodiment described above with reference to FIG. 3, each jump arm assembly 108p', 108p" 108p''' may include or be provided in operative association with a respective jump arm spacer 152. Specifically, in several embodiments, each jump arm spacer 152 may be configured to be provided in operative association with a respective clamp unit 132 of each jump arm assembly 108p', 108p" 108p''' such that a desired or optimal lateral spacing 150p' is maintained between each adjacent pair of jump arm assemblies 108p', 108p" 108p'''. For instance, in one embodiment, each jump arm spacer 152 may be coupled to or formed integrally with its respective clamp unit 132 such that the jump arm spacer 152 is configured to abut against or otherwise engage an adjacent jump arm spacer(s) 152 of the adjacent clamp unit(s) 132. In particular, in one embodiment, an end of each jump arm spacer 152 is configured to abut against or otherwise engage an adjacent end of an adjacent jump arm spacer 152. Such abutting engagement may allow the spacers 152 to maintain the desired lateral spacing 150p' between adjacent pairs of jump arm assemblies across the length of the jump arm frame unit 110p. For example, any force (e.g., any lateral force) exerted upon a jump arm assembly may be translated to adjacent or successive jump arm assemblies via the abutting jump arm spacers 152, thereby allowing the force to be dissipated along the entire disc row 106p through the combined interactions of each jump arm spacer with the next successive jump arm spacer.

In one embodiment, each jump arm spacer 152 may be removably coupled to its respective clamp unit 132, such as by using suitable fasteners. For instance, as shown in the illustrated embodiment of FIGS. 4 and 5, each jump arm spacer 152 is mounted to its respective clamp unit 132 using fasteners 134p, such as via a second nut 154 threaded onto the bolt 138p used to couple the clamp subunits 132p, 132p' of each clamp unit 132 to each other. Alternatively, each jump arm spacer 152 may be secured to its respective clamp 132 via the existing nut 140p used to couple the paired flanges 136p, 136p' together. In other embodiments, each jump arm spacer 152 may be removably coupled to its respective clamp unit 132 using any other suitable attachment configuration, such as by using fasteners to secure each jump arm spacer 152 to its respective clamp unit 132 at any other suitable location defined along one or both of the clamp subunits 132p, 132p'. In another embodiment, each jump arm spacer 152 may be secured to its respective clamp unit 132 via welding, such as by welding each jump arm spacer 152 to one of the clamp subunits 132p, 132p'. Additionally, in one embodiment, each jump arm spacer 152 may be secured or coupled to either the top or bottom edge of its respective clamp unit, such as at or adjacent to one of the corners 142p (FIG. 2) of one of the clamp subunits 132p, 132p'. Moreover, in one embodiment, it may be desirable for each jump arm assembly to include a pair of jump arm spacers 152 associated therewith, such as by including a first or upper jump arm spacer 152 coupled to the top edge of each clamp unit 110 (e.g., at the corner 142p (FIG. 2) of the upper clamp subunit 132p) and a second or lower jump arm spacer 152 coupled to the bottom edge of each clamp unit 110 (e.g., at the corner 142p (FIG. 2) of the lower clamp subunit 132p').

In several embodiments, each jump arm spacer 152 may correspond to a single continuous or integral component. For instance, as shown in the illustrated embodiment of FIGS. 4 and 5, each jump arm spacer 152 may be an elongated component (e.g., a length of steel), with one or both ends or end portions of the spacer 152 being bent at an angle relative to an intermediate or mounting portion 160 of the spacer 152 to form corresponding abutment flanges 156, 158 extending outwardly from opposed ends of the mounting portion 160. In such an embodiment, each jump arm spacer 152 may be dimensioned such that the first flange 156 of a first jump arm spacer mounted on a first jump arm assembly (e.g., jump arm assembly 108p') abuts a second flange 158 of a second jump arm spacer 152 mounted on the next successive jump arm assembly (e.g., jump arm assembly 108p"). In this manner, as described above, any force exerted upon a jump arm assembly 108p is translated to its respective jump arm spacer 152, where the force may be dissipated along the entire disc row 106p' through the combined interactions of each jump arm spacer with the next successive jump arm spacer (e.g., via engagement of the adjacent abutment flanges 156, 158). As a result, each jump arm assembly 108p and its associated tilling disc 106p may maintain their desired lateral position and spacing along the disc row 106p', thereby preventing undesirable operation of the associated tilling machine, such as by preventing the untilled ridges A or B described above with reference to FIGS. 2B and 2C.

It should be appreciated that, as an alternative to the spacer configuration shown in FIGS. 4 and 5, each jump arm spacer 152 may have any other suitable configuration that allows it to function as described herein. For instance, in one alternative embodiment, each jump arm spacer 152 may be formed from two separate components or portions coupled or secure to its respective clamp unit 152 such that a first portion of the jump arm spacer 152 is positioned at or adjacent to one lateral side of the clamp unit 132 to form the first abutment flange 156 of the spacer 152 and a second portion of the jump arm spacer 152 is positioned at or adjacent to the opposed side of the clamp unit 132 to form the second abutment flange 158 of the spacer 152.

Figure 6:
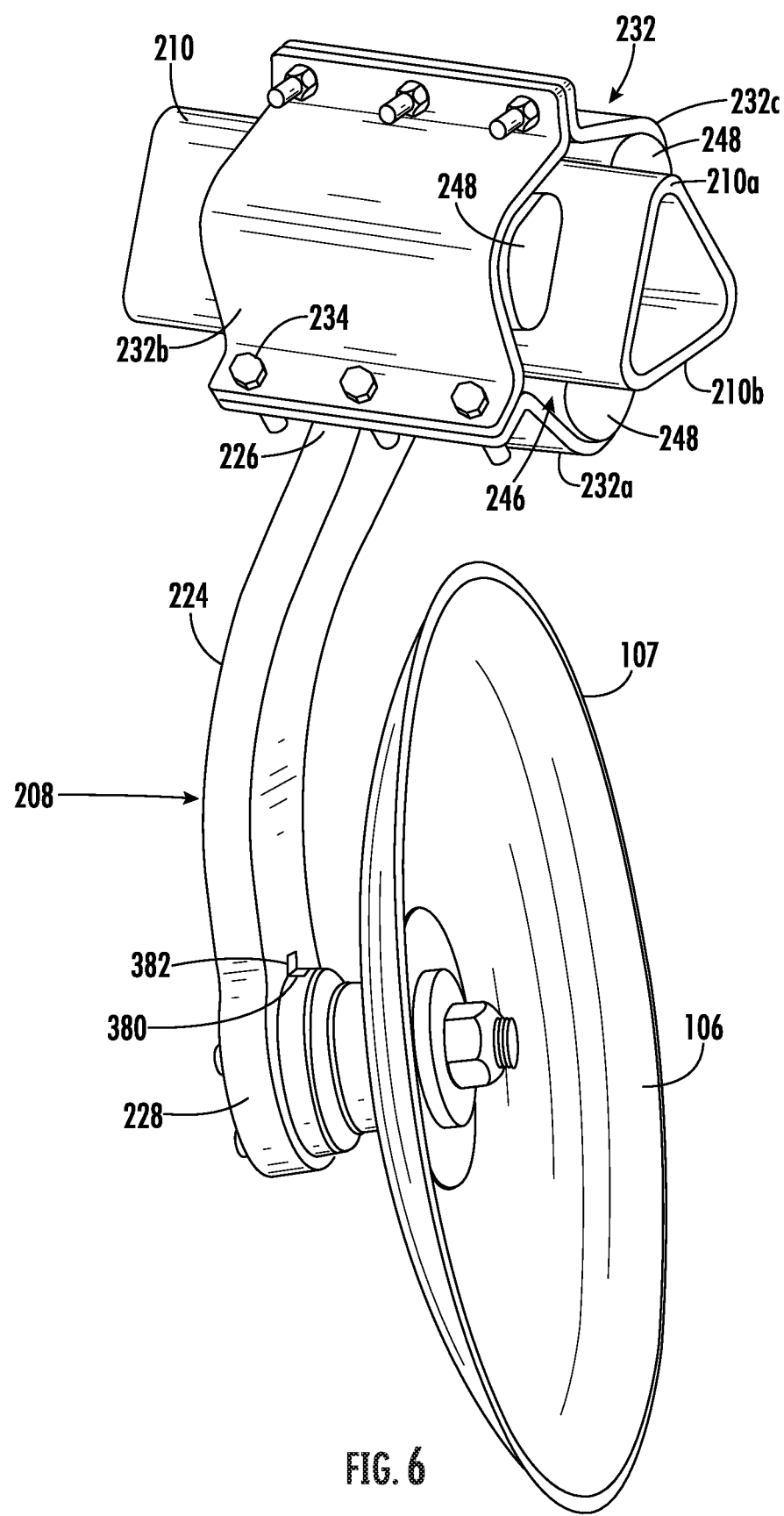
FIG. 6 illustrates a perspective view of one embodiment of a jump arm apparatus including a triangular jump arm frame unit and a related jump arm assembly in accordance with aspects of the present subject matter.
Figure 7:
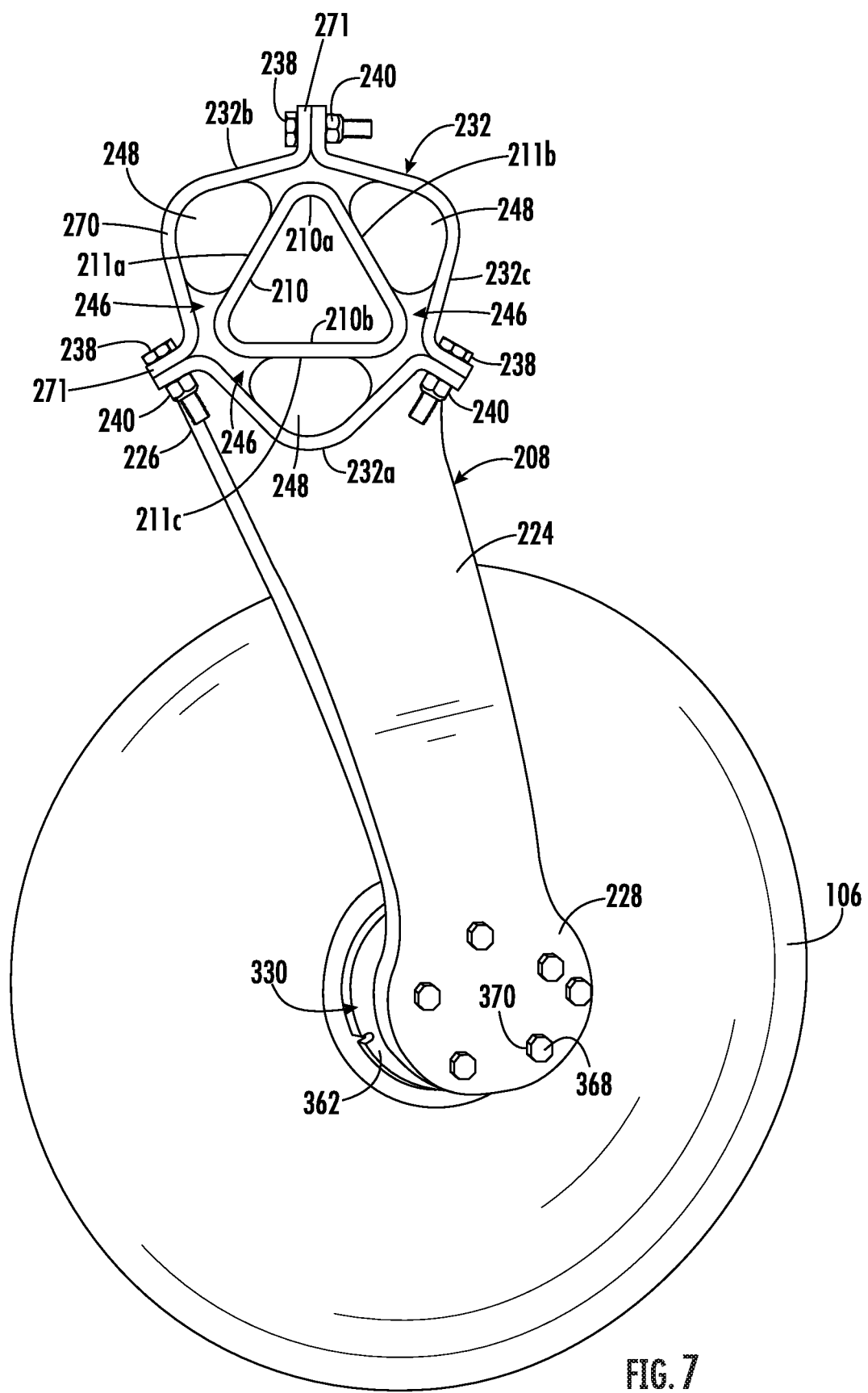
FIG. 7 illustrates an end view of the jump arm apparatus shown in FIG. 6.

Turning now to FIGS. 6 and 7, different views of one embodiment of a jump arm frame unit 210 suitable for use within a tilling machine (e.g., tilling machine 100a) are illustrated in accordance with aspects of the present subject matter. Specifically, FIG. 6 illustrates a perspective view of a portion of the jump arm frame unit 210 having a jump arm assembly 208 mounted thereto. Additionally, FIG. 7 illustrates an end view of the jump arm frame unit 210 and jump arm assembly 208 shown in FIG. 6.

As shown in the illustrated embodiment, unlike the embodiment of the jump arm frame unit 110p described above, the jump arm frame unit 210 of FIGS. 6 and 7 has been modified to include or define a triangular transverse cross-section. Specifically, the triangular transverse cross-section defines an equilateral triangle, whereby each vertex is about 60 degrees. In one embodiment, jump arm frame unit 210 is oriented within the frame unit 102a (FIG. 1) of the tilling machine 100a such that vertex 210a points upwardly and planar side 210b lies in a plane oriented generally parallel with the ground (or perpendicular to vertical) and defines the lowest extent of jump arm frame unit 210.

In one embodiment, to accommodate the triangular jump arm frame unit 210, each jump arm assembly, such as the exemplary jump arm assembly 208 shown in FIGS. 6 and 7, includes a jump arm 224 having a first end 226 coupled to the jump arm frame unit 210 via a clamp unit 232 and a second end 228 opposite the first end 226. As shown in the illustrated embodiment, the clamp unit 232 is configured as a three-piece assembly including a first clamp subunit 232a, a second clamp subunit 232b, and a third clamp subunit 232b. In one embodiment, the first end 226 of the jump arm 224 may be secured to one of the clamp subunits, such as the first clamp subunit 232a. In such an embodiment, the second and third clamp subunits 232b, 232c may be secured to the first clamp subunit 232a and one another, such as via fasteners 234, so as to form the generally tubular shaped clamp unit 232. Fasteners 234 may include a bolt 238 and nut 240. While not shown, the illustrated jump arm assembly 208 and successive or adjacent jump arm assemblies 208 may further include a jump arm spacer 152 as described above with regard to FIGS. 4 and 5. It should be noted that while shown and described as composing three clamp subunits 232a, 232b, 232c, clamp unit 232 may be comprised of any number of subunits, such as but not limited to two subunits similar to clamp subunits 132p, 132p' described above or four or more subunits.

As particularly shown in FIG. 7, each clamp subunit 232a, 232b, 232c generally forms a 120-degree circumferential section of the clamp unit 232 and includes a bent or curved central section 270 extending between opposed mounting flanges 271. In such an embodiment, the flanges 171 of adjacent clamp subunits 232a, 232b, 232c are configured to be mounted to each other via the fasteners 234 to assemble the clamp subunits 232a, 232b, 232c around the jump arm frame unit 210. As shown in FIG. 7, the profile of the curved central section 270 of each camp subunit 232a, 232b, 232c allows for generally triangularly shaped voids 246 to be formed between each camp subunit 232a, 232b, 232c and an adjacent outer face of the jump arm frame unit 210. For instance, given its triangular shape, the jump arm frame unit 210 defines three outer faces 211 (FIG. 7), namely a first outer face 211a, a second outer face 211b, and a third outer face 211c, with each void 246 being generally defined between the central section 270 of each clamp subunit 232a, 232b, 232c and the adjacent outer face 211 of the jump arm frame unit 210.

The jump arm frame unit 210 is generally configured to be received within each clamp unit 232 in the manner shown in FIG. 7, with the triangularly shaped voids 246 being spaced equally around the outer perimeter of the jump arm frame unit 210 at each face 211 of the frame unit 210. In such an embodiment, each void 246 may receive a respective jump arm support 248. Similar to jump arm supports 148p described above, jump arm supports 248 may be fabricated from rubber, although other non-limiting examples of suitable support materials include compressible natural and synthetic polymeric materials and/or blends thereof. Jump arm supports 248 operate as torsional supports to absorb shock to jump arm assembly 208 during tilling. Jump arm supports 248 also promote flexing of jump arm assembly 208, while maintaining downforce to jump arm assembly 208 and tilling disc 106, such as when striking a large rock within the soil. Similar to prior art rubber supports 148p described above, jump arm supports 248 assist in resisting rotation forces subjected to jump arm assembly 208. However, because jump arm frame unit 210 has a triangular cross section, jump arm assembly 208 must be rotationally displaced 60 degrees before the assembly 208 would rotate on the jump arm frame unit 210, at which point disc 106 would no longer be impacting the ground. In contrast, the jump arm assembly 108p on the square jump arm frame unit 110p described above must only be rotationally displaced 45 degrees before the assembly 108p would rotate on the jump arm frame unit 110p, at which point disc 106p would no longer be impacting the ground. As a result, the triangular jump arm frame unit 210 allows for increased pivotability or rotation of the jump arm assembly 208 relative to the frame unit 210 prior to the jump arm assembly 208 being displaced to an inoperable position. Accordingly, the jump arm assembly 208 is provided with a greater pivot or travel range and, thus, greater flexibility when encountering larger rocks or other obstacles within the field.

Figure 8:
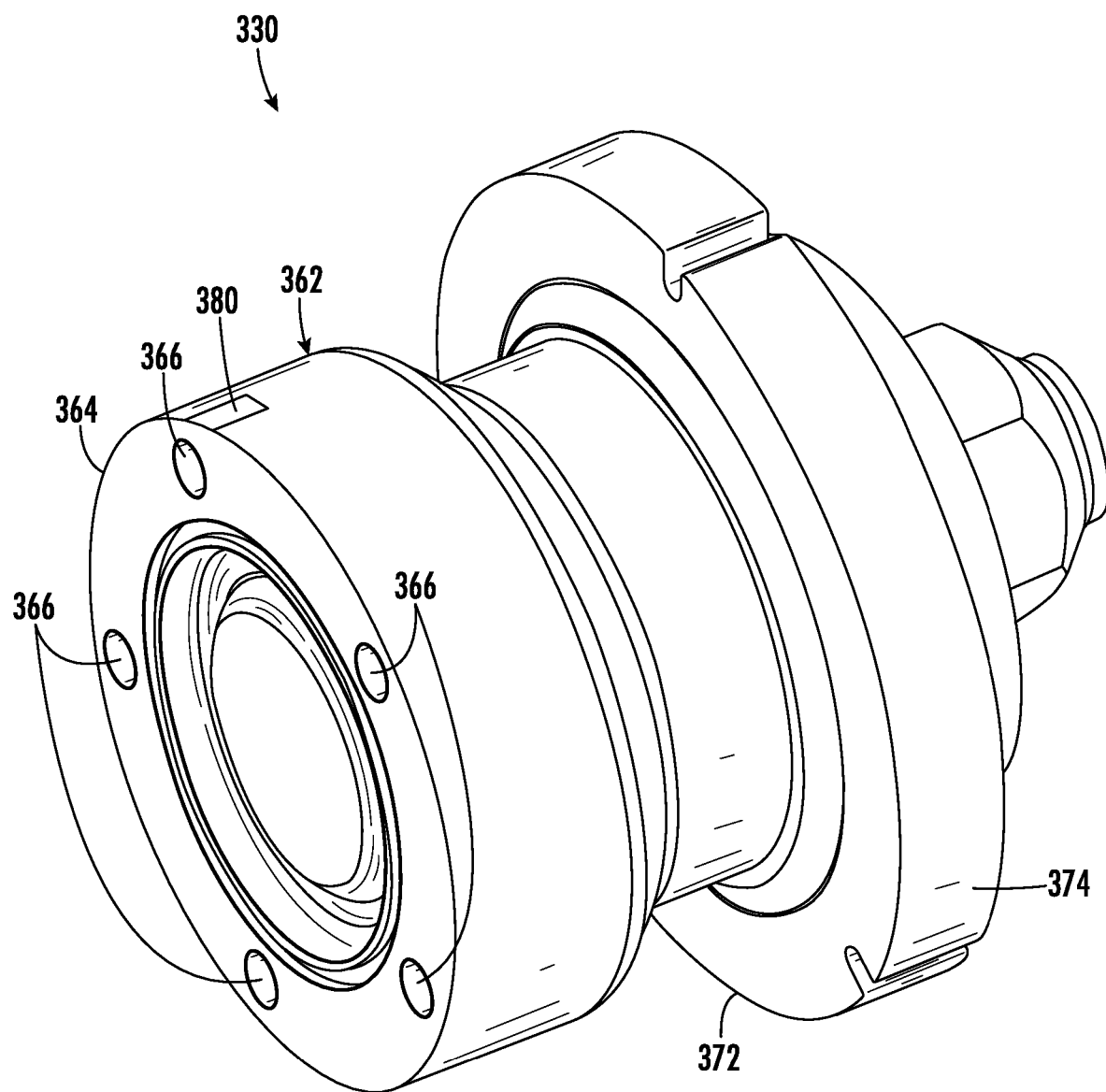
FIG. 8 illustrates a perspective view of one embodiment of a variable angle disc hub assembly for use within a jump arm assembly in accordance with aspects of the present subject matter.
Figure 9:
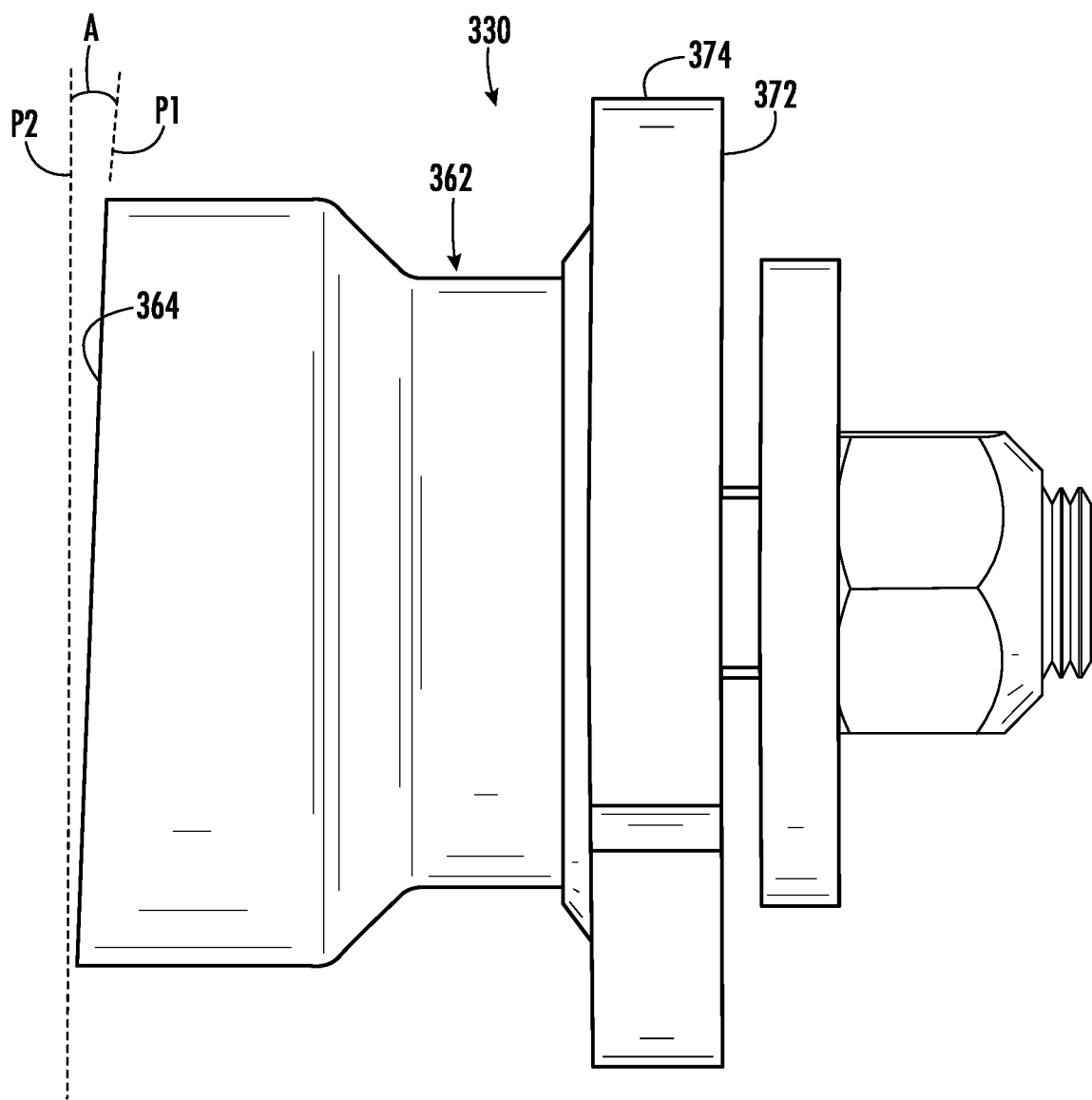
FIG. 9 illustrates a side view of the variable angle disc hub assembly shown in FIG. 8.

Referring now to FIGS. 8 and 9, differing views of one embodiment of a variable angle disc hub assembly 330 suitable for use with a jump arm assembly, such as the jump arm assembly 208 described above with reference to FIGS. 6 and 7, are illustrated in accordance with aspects of the present subject matter. Specifically, FIG. 8 illustrates a perspective view of the disc hub assembly 330, and FIG. 9 illustrates a side view of the disc hub assembly 330.

As shown in FIGS. 8 and 9, the disc hub assembly 330 includes a hub housing 362 and an end plate 374 provided in operative association with the hub housing 362. The hub housing 363 has an arm end 364 configured to be fixedly secured to the jump arm of an associated jump arm assembly (e.g., the second end 228 of the jump arm 224 shown in FIG. 6). For instance, in one embodiment, the hub housing 362 may include an annular array of equally spaced mounting features, such as threaded mounting holes 366, for mounting the arm end 364 of the housing 362 to an associated jump arm. In such an embodiment, each threaded mounting hole 366 may be configured to matingly couple with a corresponding mounting element, such as a bolt 368, passing through a respective aperture 370 defined through the second end 228 of the jump arm 224 FIG. 7 to secure the hub housing 362 to the jump arm 224. Specifically, the jump arm 224 may include a corresponding annular array of apertures 370 (FIG. 7) configured to be aligned with the mounting holes 366 defined in the hub housing 362. As such, by circumferentially aligning the mounting holes 366 of the hub housing 362 with the apertures 370 of the jump arm 224, the bolts 368 may be inserted through the aligned holes/apertures to facilitate securing the disc hub assembly 330 to the jump arm 224. It should be appreciated that, while the mounting features have been described as threaded holes 366 and the mounting elements as bolts 368, the hub housing 362 may, alternatively, include threaded shaft mounting features similar to bolts 368 which are configured to threadably receive corresponding nuts to secure the hub housing to the jump arm.

Additionally, the disc hub assembly 330 further includes a disc end 372 opposite the arm end 364 of the hub housing 362. As shown in the illustrated embodiment, the disc end 372 of the hub 330 is defined by the end plate 374 of the hub assembly 330. As shown most clearly in FIG. 9, a first plane P1 defined by the arm end 364 of hub housing 362 is arranged in non-parallel relation with respect to a second plane P2 defined by the disc end 372 of the hub assembly 330. Specifically, in several embodiments, the first plane P1 defined by the arm end 364 of hub housing 362 may be skewed or offset relative to the plane P2 defined by the disc end 372 of the hub assembly 330 by an offset angle A. In accordance with aspects of the present subject matter, the offset angle A may, for instance, correspond to an angle ranging from about 0.5 degrees to about 30 degrees, such as from about 1 degree to about 20 degrees, or from about 2 degrees to about 15 degrees or from about 3 degrees to about 10 degrees, and/or any other subranges therebetween. As a result, disc hub assembly 330 may function as a variable angle disc hub, whereby the angle of the mounted disc 106 relative to the ground may be selectively altered depending upon the orientation of the disc hub assembly 330 when mounted to the jump arm 224. Specifically, the circumferential orientation of the disc hub assembly 330 relative to the jump arm 24 may be adjusted to selectively change which threaded holes 366 align with the apertures 370 (FIG. 7) defined through the second end 228 of the jump arm 224. In this regard, the selected orientation of the hub assembly 330 dictates the angle of P1 with respect to the ground (horizontal plane), with the angle of the disc 106 mounted onto disc hub 330 assembly, in turn, lying along plane P1. As a result, the degree of the hub mounting angle and, thus, the aggressiveness of the disc mounting angle may be adjusted to achieve desired performance of discs 106.

It should be appreciated that the disc hub assembly 330 may generally be configured to provide any number of preset hub mounting angles or settings based on the number of mounting features provided at the arm end 364 of the hub assembly 330 and/or the number of apertures 370 defined through the jump arm 224. For example, in the illustrated embodiment, the disc hub assembly 330 includes an annular array of five threaded holes 366 defined through the arm end 364 of the hub assembly 330 that are configured to be aligned with five corresponding apertures 370 defined through the jump arm 224, thereby allowing five different predetermined mounting angles or settings to be achieve depending on the selected circumferential orientation of the hub assembly 330 relative to the second end 228 of the jump arm 224. In other embodiments, the disc hub assembly 330 and/or the jump arm 224 may include more or less mounting features and/or corresponding apertures, such as annular array or four or fewer threaded holes/apertures or an annular array of six or more threaded holes/apertures, in which case the disc hub assembly 330 will allow a corresponding number of hub mounting angles or settings to be achieved.

It should also be appreciated that, in one embodiment, the disc hub assembly 330 and/or the jump arm 224 may include or be provided in operative association with a visual indicator(s) to allow a user to quickly and easily determine which hub mounting angle is being selected. For instance, as shown in FIG. 8, the disc hub assembly 330 includes a visual indicator 380, such as a mark, notch, number, etc., adjacent to the arm end 364 of the hub assembly 330. In such an embodiment, as shown in FIG. 6, a corresponding visual indicator 382, such as a mark, notch, number, etc., may also be provided on the jump arm 224 (e.g., at a location adjacent to the disc hub assembly 330) to provide an indication of the hub mounting angle. For instance, in the illustrated embodiment, when the two visual indicators are circumferentially aligned (e.g., as shown in FIG. 6), it may be indicative of a given hub mounting angle (e.g., the minimum hub mounting angle or the maximum hub mounting angle). In such instance, rotation of the disc hub assembly 330 relative to the jump arm 224 in one direction or the other to a different circumferential position may increase or decrease the hub mounting angle. In another embodiment, the disc hub 300 may include a plurality of unique visual indicators spaced apart from one another around the outer circumference of the hub assembly 330, such as circumferentially spaced marks or notches that are indicative of preset hub mounting angles or actual numbers that specify the selected hub mounting angle. In such an embodiment, the desired hub mounting angle may be selected by aligning the appropriate visual indicator on the hub assembly 330 with the visual indicator 382 provided on the jump arm 224.

Figure 10:
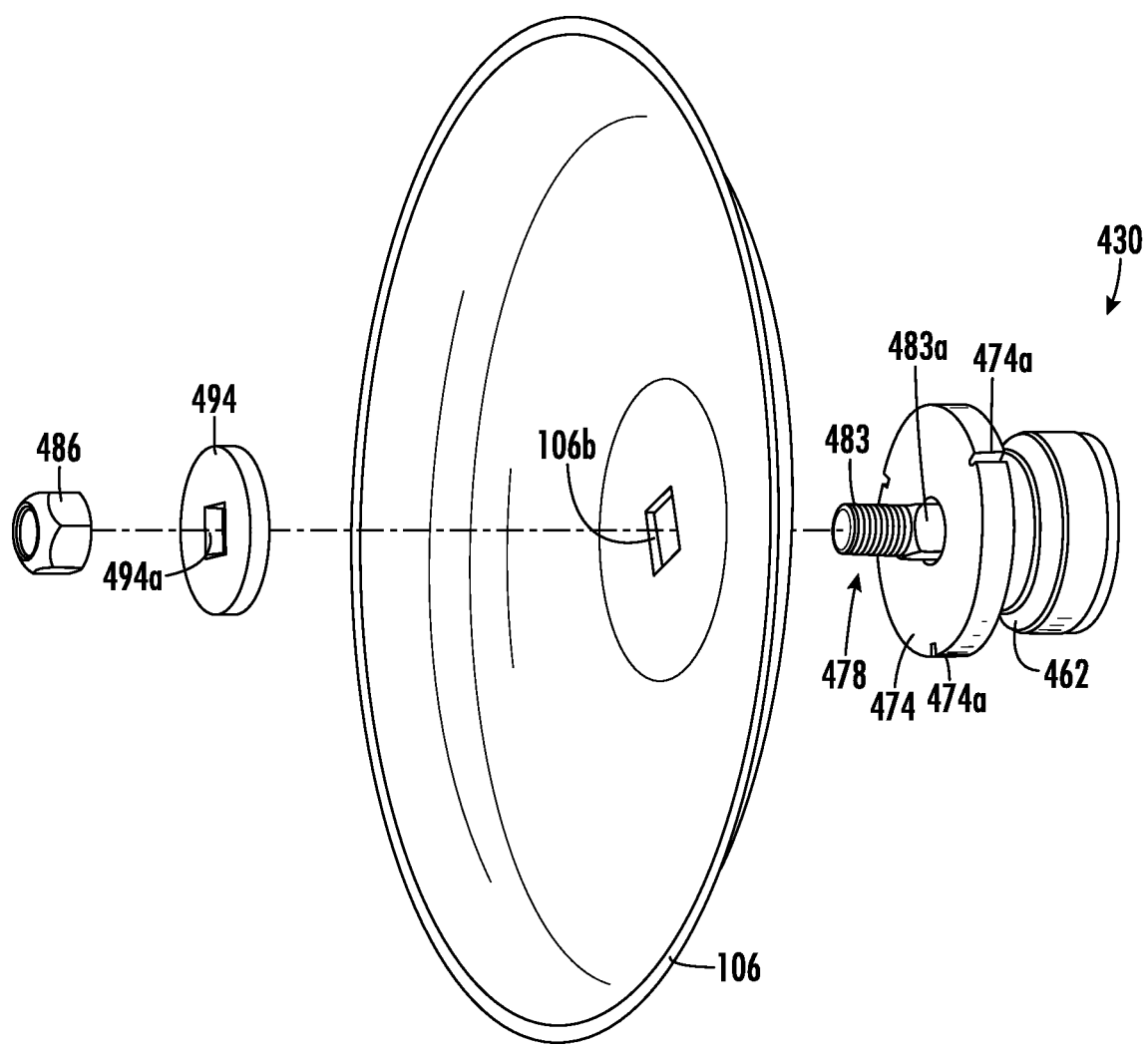
FIG. 10 illustrates an exploded view of one embodiment of a single bolt disc hub assembly and corresponding tilling disc in accordance with aspects of the present subject matter.
Figure 11:
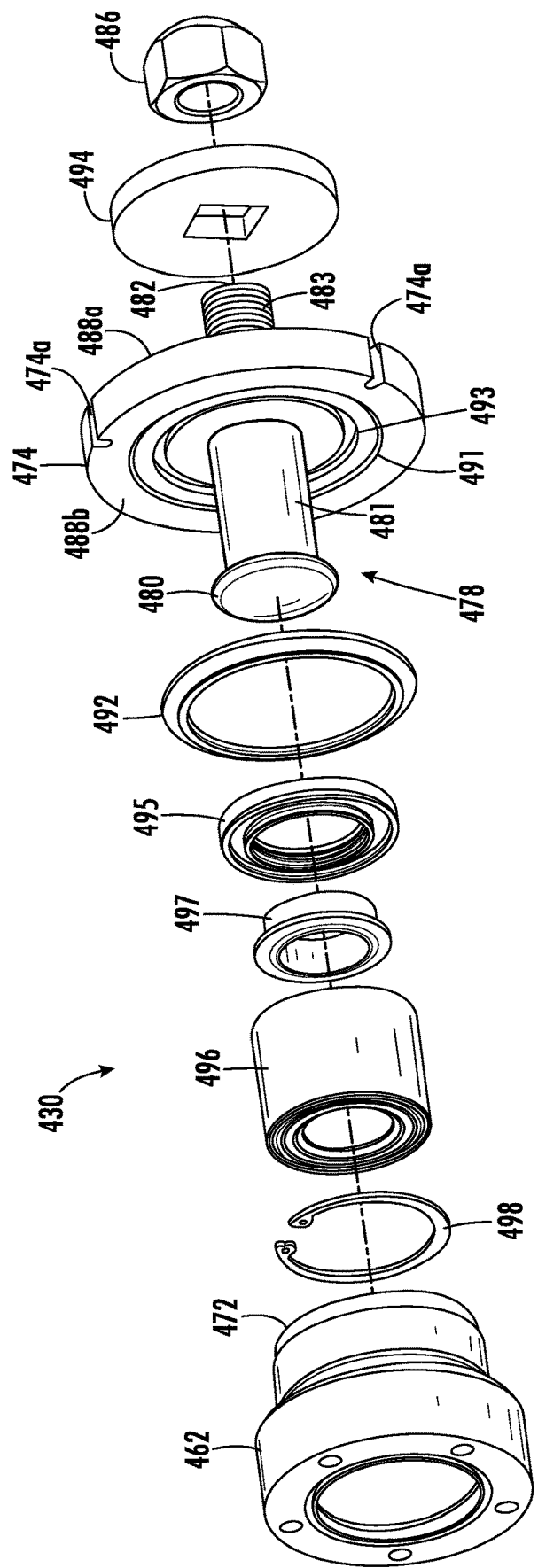
FIG. 11 illustrates an exploded view of the disc hub assembly shown in FIG. 10.
Figure 12:
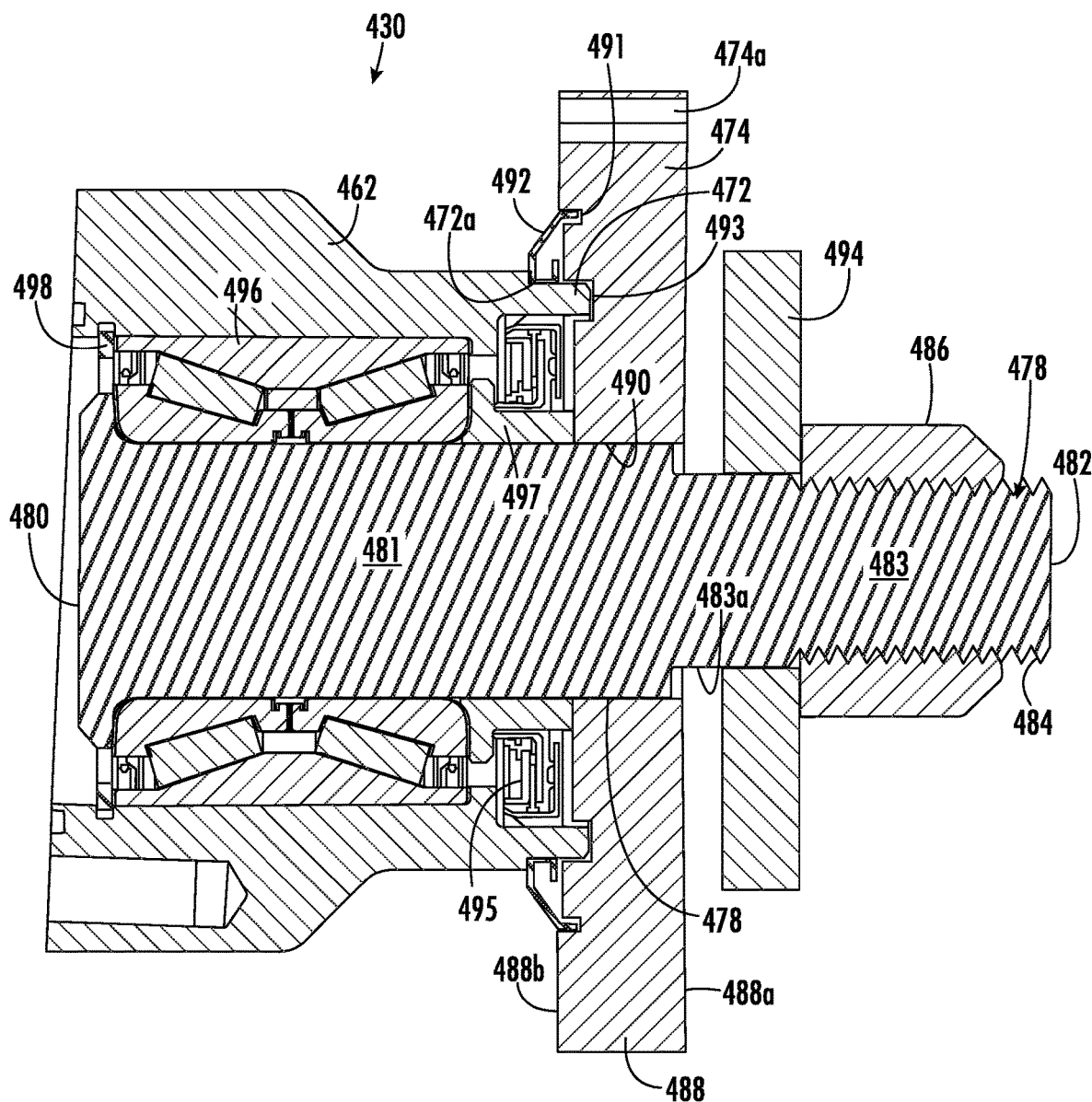
FIG. 12 illustrates a cross-sectional view of the disc hub assembly shown in FIG. 10.

Referring now to FIGS. 10-12, differing views of one embodiment of a single bolt disc hub assembly 430 are illustrated in accordance with aspects of the present subject matter. Specifically, FIG. 10 illustrates a perspective, partially exploded view of components of the disc hub assembly 430 relative to an associated disc 106. Additionally, FIG. 11 illustrates an exploded view of the disc hub assembly 430 shown in FIG. 10, while FIG. 12 illustrates a cross-sectional view of the disc hub assembly 430 shown in FIG. 11.

Referring briefly back to FIG. 3, discs 106*p* are typically mounted to prior art disc hubs 130*p* using a plurality of bolts threaded into receiving apertures defined within the disc end 172*p* of the hub 130*p* after passing through corresponding holes 176*p* defined within disc 106*p*. To remove and replace disc 106*p*, each of the plurality of bolts have to first be removed, followed by remounting of a new disc 106*p* and rethreading of each bolt. As can be discerned, this operation is time-consuming and may be inconvenient should repair or replacement be required while the tilling machine is employed in the field. Accordingly, the disclosed single bolt disc hub assembly 430 can be used to simplify disc removal/replacement as will be described in greater detail below.

In several embodiments, the disc hub assembly 430 may include one or more components configured the same as or similar to the components of the disc hub assembly 330 described above. For instance, the disc hub assembly 430 may include a hub housing 462 and an end plate 474 configured the same as or similar to the hub housing 362 and the end plate 374, respectively, of the disc hub assembly 330. In such an embodiment, the plane defined by the end face of the hub housing 462 may be offset or skewed relative to the plane defined by the opposed end face of the end plate 474 (e.g., similar to that shown in FIG. 9). Alternatively, the hub housing 462 and the end plate 474 may be configured to include generally parallel end faces or planes.

As shown most clearly in FIG. 12, in addition to the hub housing 462 and the end plate 474, the disc hub assembly 430 also includes a shaft 478 extending lengthwise or axially between a first shaft end 480 and an opposed second shaft end 482. In several embodiments, the shaft 478 may be characterized by two unique or differently configured axial sections extending between its opposed shaft ends 480, 482 (namely a first axial shaft section 481 and a second axial shaft section 483), with the first axial shaft section 481 extending axially from the first shaft end 480 to the second axial shaft section 483 and the second axial shaft section 483 extending from the first axial shaft section 481 to the second shaft end 482. As particularly shown in FIG. 12, the first axial shaft section 481 may be configured to be received through and supported for rotation within the hub housing 462, while the second axial shaft section 483 is configured to allow a corresponding tilling disc 106 (FIG. 10) to be secured to the disc hub assembly 430. For instance, as shown in FIG. 12, the second axial shaft section 483 may be at least partially threaded, such as by including or incorporating a threaded portion defining male threads 484 configured to matingly receive a single threaded nut 486, to secure the tilling disc 106 to the shaft 478. In this regard, the shaft 478 may provide the sole connection point between jump arm 224 and the tilling disc 106. Accordingly, unlike conventional systems that utilize a multi-bolt mounting arrangement, the disclosed disc hub assembly 430 allows for a single fastening or coupling member (i.e., in the form of the shaft 478) to be provided for coupling the jump arm 224 to the tilling disc 106. As a result, the hub assembly 430 performs a dual function of rotationally supporting the disc 106 relative to the jump arm 224, while also providing the sole connection point between the disc 106 and the jump arm 224.

Additionally, as shown in FIG. 12, the end plate 474 includes a plate body 488 having a front surface 488*a*, a rear surface 488*b*, and a through-hole or aperture 490 defined through the plate body 488 and extend axially between the front and rear surfaces 488*a*, 488*b*. In one embodiment, the shaft 478 is configured to be inserted through the aperture 490 such that the second axial shaft section 483 extends or projects outwardly beyond the front surface 488*a* of the plate body 488 to allow the disc 106 to be mounted to the shaft 478 along such side of the end plate 474. In this regard, the front surface 488*a* of the plate body 488 may be configured to abut against the tilling disc 106 when the disc is secured on the shaft 478 via the single nut 486 threaded onto the male threads 484 of second axial shaft section 483. A washer 494 may also be positioned between the nut 486 and the end plate 474 when the disc 106 is mounted on the shaft 478. Moreover, as shown in FIG. 12, the rear surface 488*b* of the plate body 488 is configured to abut against the hub housing 462. In one embodiment, one or more annular channels or slots may be defined relative to the rear surface 488*b* of the plate body 488 to accommodate additional components of the disc hub assembly 430 and/or to facilitate abutting engagement between the rear surface 488*b* and the hub housing 462. For instance, as shown in FIG. 12, a radially outer, first annular slot 491 is defined relative to the rear surface 488*b* of the plate body 488 that is configured to receive a portion of an annular seal 492 for sealing the housing 462 to the end plate 474. Specifically, as shown in FIG. 12, the annular seal 492 is configured to extend between the first annular slot 491 defined relative to the rear surface 488*b* and an outer circumferential surface 472*a* of the hub housing 462. Additionally, as shown in FIG. 12, a radially inner, second annular slot 493 is defined relative to the rear surface 488*b* of the plate body 488 that is configured to receive an end 472 of the hub housing 462.

Additionally, as shown in FIG. 12, a bearing 496 is configured to be received within hub housing 462 for rotationally supporting the first axial shaft section 481 of the shaft 478 relative to the housing 462. A lock ring 498 may be used to axially retain the bearing 496 within the hub housing 462. For instance, in one embodiment, the first axial shaft section 481 may be configured to be press-fit into the bearing 496 such that the shaft rotates with the inner race of the bearing 496 relative to both the outer race of the bearing 496 and the hub housing 462.

Additionally, in one embodiment, the first axial shaft section 481 may be press-fit into the aperture 490 defined through the plate body 488 of the end plate 474, thereby rotatably coupling the shaft 478 to the end plate 474. As a result, the end plate 474 may rotate with the shaft 478 relative to the hub housing 462 and the outer annular seal 492 extending between the end plate 474 and the housing 462. Such press-fitting of the first axial shaft section 481 into the aperture 490 can be done, for example, in combination with such axial shaft section 481 being press-fit into the bearing 496 or in instances in which the first axial shaft section 481 is not press-fit into the bearing 496. By press-fitting first axial shaft section 481 into the aperture 490, the end plate 474 may, for instance, function to retain the axial positioning of the various components located within the hub housing 462 (e.g., the bearing 496, internal annular seal 495, and seal spacer 497) and may also function (in combination with the outer seal 492) to prevent dust and other contaminates from entering the hub housing 462 at its adjacent end 472.

Moreover, as shown in FIG. 10, in addition to the threaded portion, the second axial shaft section 483 may include a non-circular, non-threaded portion 483*a* (FIG. 10) configured to extend through a corresponding non-circular aperture 106*b* defined through the disc 106 and an aperture 494*a* in the washer 494, whereby travel of the tilling machine 100 causes rotation of the disc 106 with the shaft 478 via the bearing 496 so as to turn over soil rather than allow free rotation of disc 106. Additionally, to assist with removal of the threaded nut 486 (along with washer 494 and disc 106), the end plate 474 may include one or more notches 474*a* configured to receive a tool, such as a spanner or screw driver. In this manner, nut 486 may be unthreaded from second axial shaft section 482 without rotation of the shaft 478.

It should be appreciated that, in addition to the outer annular seal 492, the disc hub assembly 430 may also include an internal annular seal 495 configured to be supported within the hub housing 462 relative to the shaft 478 via a seal spacer 497. As shown in the illustrated embodiment, the seal spacer 497 is configured as a separate component from the end plate 474. However, in other embodiments, the seal spacer 497 may be formed integrally with the end plate 474.

The foregoing description of the preferred embodiments of the present subject matter have been presented for the purpose of illustration and description. It is not intended to be exhaustive nor is it intended to limit the present subject matter to the precise form disclosed. It will be apparent to those skilled in the art that the disclosed embodiments may be modified in light of the above teachings. The embodiments described are chosen to provide an illustration of principles of the present subject matter and its practical application to enable thereby one of ordinary skill in the art to utilize such subject matter in various embodiments and with various modifications as are suited to the particular use contemplated. Therefore, the foregoing description is to be considered exemplary, rather than limiting, and the true scope of the present subject matter is that described in the following claims.

Additionally, it should be appreciated that the foregoing description uses examples to disclose the present subject matter, including the best mode, and also to enable any person skilled in the art to practice such subject matter, including making and using any devices or systems and performing any incorporated methods. As noted above, the patentable scope of the present subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A jump arm assembly for a tilling machine configured to be towed across a field, the jump arm assembly comprising:
    a jump arm having a first end configured to be coupled to a frame unit of the tilling machine and a second end configured to be coupled to a tilling disc of the tilling machine; and,
    a variable angle disc hub assembly configured to be coupled between the second end of the jump arm and the tilling disc, the disc hub assembly comprising:
        a hub housing defining an arm end of the disc hub assembly, the arm end configured to be positioned adjacent to the jump arm;
        an end plate provided in operative association with the hub housing and defining a disc end of the disc hub assembly, the disc end configured to be positioned adjacent to the tilling disc; and
        a shaft including a first axial shaft section rotatably mounted within said hub housing and a second axial shaft section configured to be releasably secured to the tilling disc, said second axial shaft section being least partially threaded to receive a single threaded nut for securing the tilling disc to said disc hub assembly;
    wherein a first plane defined by said arm end of said disc hub assembly is arranged in non-parallel relation with respect to a second plane defined by said disc end of said disc hub assembly.

2. The jump arm assembly of claim 1, wherein the first plane is skewed relative to the second plane by an offset angle.

3. The jump arm assembly of claim 2, wherein the offset angle ranges from about 0.5 degrees to about 30 degrees.

4. The jump arm assembly of claim 3, wherein the offset angle ranges from about 3 degrees to about 10 degrees.

5. The jump arm assembly of claim 1, wherein a circumferential orientation of the disc hub assembly is adjustable relative to the jump arm to vary a mounting angle of the disc hub assembly relative to the jump arm.

6. The jump arm assembly of claim 5, wherein at least one of the disc hub assembly or the jump arm includes a visual indicator to provide an indication of the mounting angle of the disc hub assembly.

7. The jump arm assembly of claim 6, wherein both the disc hub assembly and the jump arm include a visual indicator such that relative circumferential alignment between the visual indicator of the disc hub assembly and the visual indicator of the jump arm provides an indication of the mounting angle of the disc hub assembly.

8. The jump arm assembly of claim 5, wherein an annular array of mounting holes is provided at the arm end of the disc hub assembly, wherein each mounting hole is configured to be circumferentially aligned with a respective aperture of a plurality of corresponding apertures defined through the jump arm.

9. The jump arm assembly of claim 8, wherein the mounting angle of the disc hub assembly is adjustable by rotating the disc hub assembly relative to the jump arm to adjust the circumferential alignment between the mounting holes of the disc huh assembly and the apertures of the jump arm.

10. The jump arm assembly of claim 1, wherein said disc hub assembly further comprises a bearing positioned within said hub housing, said first axial shaft section of said shaft being rotatably supported within said hub housing via said bearing.

11. The disc hub of claim 1, wherein said end plate includes a plate body having a front surface, a rear surface, and an aperture defined through said plate body between said front and rear surfaces, wherein said shaft extends through said aperture such that said second axial shaft section projects outwardly from said plate body, wherein said rear surface of said end plate abuts said hub housing, and wherein said front surface of said end plate is configured to abut the tilling disc when the tilling disc is mounted on said shaft.

12. A jump arm assembly for a tilling machine configured to be towed across a field, the jump arm assembly comprising:
   a jump arm having a first end configured to be coupled to a frame unit of the tilling machine and a second end configured to be coupled to a tilling disc of the tilling machine; and,
   a variable angle disc hub assembly configured to be coupled between the second end of the jump arm and the tilling disc, the disc hub assembly comprising:
      a hub housing defining an arm end of the disc hub assembly, the arm end configured to be positioned adjacent to the jump arm;
      an end plate provided in operative association with the hub housing and defining a disc end of the disc hub assembly, the disc end configured to be positioned adjacent to the tilling disc, said end plate including a plate body having a front surface, a rear surface, and an aperture defined through said plate body between said front and rear surfaces, wherein said rear surface of said end plate abuts said hub housing, and wherein said front surface of said end plate is configured to abut the tilling disc when the tilling disc is mounted on said shaft; and
      a shaft including a first axial shaft section rotatably mounted within said hub housing and a second axial shaft section configured to be releasably secured to the tilling disc;
   wherein:
   a first plane defined by said arm end of said disc hub assembly is arranged in non-parallel relation with respect to a second plane defined by said disc end of said disc hub assembly; and
   said shaft extends through said aperture of said plate body such that said second axial shaft section projects outwardly from said plate body.

13. The jump arm assembly of claim 12, wherein said disc hub assembly further comprises a seal extending between said rear surface of said end plate and an outer surface of said hub housing.

14. The jump arm assembly of claim 12, wherein said disc hub assembly further comprises a bearing positioned within said hub housing, said first axial shaft section of said shaft being press-fit into both said bearing and said aperture defined through said plate body of said end plate.

15. A jump arm assembly for a tilling machine configured to be towed across a field, the jump arm assembly comprising:
   a jump arm having a first end configured to be coupled to a frame unit of the tilling machine and a second end configured to be coupled to a tilling disc of the tilling machine; and,
   a variable angle disc hub assembly configured to be coupled between the second end of the jump arm and the tilling disc, the disc hub assembly comprising:
      a hub housing defining an arm end of the disc hub assembly, the arm end configured to be positioned adjacent to the jump arm; and
      an end plate provided in operative association with the hub housing and defining a disc end of the disc hub assembly, the disc end configured to be positioned adjacent to the tilling disc;
   wherein:
   a first plane defined by said arm end of said disc hub assembly is arranged in non-parallel relation with respect to a second plane defined by said disc end of said disc hub assembly; and
   the end plate is rotatable relative to the hub housing.

16. The jump arm assembly of claim 15, wherein the first plane is skewed relative to the second plane by an offset angle.

17. The jump arm assembly of claim 15, wherein a circumferential orientation of the disc hub assembly is adjustable relative to the jump arm to vary a mounting angle of the disc hub assembly relative to the jump arm.

18. The jump arm assembly of claim 15, wherein the disc hub assembly further comprises a shaft having a first axial shaft section rotatably mounted within said hub housing and a second axial shaft section end extending outwardly from said hub housing, the end plate being coupled to the shaft for rotation therewith relative to the hub housing.

19. The jump arm assembly of claim 15, wherein said disc hub assembly further comprises a bearing positioned within said hub housing, said first axial shaft section of said shaft being supported within said hub housing via said bearing for rotation relative to the hub housing.

20. The jump arm assembly of claim 15, wherein the arm end of the disc hub assembly is configured to abut against the jump arm and the disc end of the disc hub assembly is configured to abut against the tilling disc.

\* \* \* \* \*